United States Patent [19]

Runels

[11] Patent Number: 4,804,027
[45] Date of Patent: Feb. 14, 1989

[54] AXLE AND WHEEL ASSEMBLY

[75] Inventor: Thomas L. Runels, Battle Creek, Mich.

[73] Assignee: Eaton Corporation, Cleveland, Ohio

[21] Appl. No.: 98,343

[22] Filed: Sep. 17, 1987

[51] Int. Cl.$^4$ .............................................. B60C 23/10
[52] U.S. Cl. .................................... 152/417; 137/580; 277/27; 277/34; 277/152
[58] Field of Search .............................. 152/415–417; 137/228, 226, 224, 580; 277/34, 34.3, 34.6, 3, 27, 152, 153

[56] References Cited

U.S. PATENT DOCUMENTS 3,330,563  7/1967  Puydt et al. ................. 277/34.6 X
3,362,452  1/1968  Harnish ............................. 152/416
4,434,833  3/1984  Swanson et al. ................. 152/417

Primary Examiner—Michael W. Ball
Assistant Examiner—Thomas Bokan
Attorney, Agent, or Firm—C. J. Toddy

[57] ABSTRACT

A vehicle wheel and axle assembly having inflatable tires to be connected with an air filling device on the vehicle, which comprises an annular sealing assembly having a pair of annular radially expanding lobes which upon pressurization expand into sealing engagement and including a normally closed check valve which permits the flow of pressurized air to said lobes and prevents the flow of pressurized air into the tires until the lobes are in sealing engagement.

8 Claims, 4 Drawing Sheets 4,804,027

AXLE AND WHEEL ASSEMBLY

This invention relates to an axle and wheel assembly and, more particularly to an axle and wheel assembly for vehicles having an onboard tire inflation system having a rotary seal assembly for sealing passages between a rotatable and non-rotatable member of the axle and wheel assembly.

U.S. Pat. Nos. 3,705,614, 4,431,043, 4,434,833 and 4,498,709 disclose axle and wheel assemblies having a rotary seal assembly including one or more annular rubber rings or the like which are in sealing engagement with a rotary member at all times, whether or not pressurized air is present. Thus, the lips are continuously in sealing engagement with the rotary members and subject to wear and possible premature failure.

On the other hand, U.S. Pat. No. 3,362,452 discloses a seal for an axle and wheel assembly which includes an annular seal assembly having resilient seal means extendible axially, when pressurized, into sealing engagement with a radial surface on the wheel hub. The seal assembly seals a chamber in the wheel hub which has an outlet to the tire.

The term "on board tire inflation system" as used herein is intended to include systems mounted on vehicles which allow tire pressure of certain axle ends to be selectively varied by the operator from a point remote from the wheels, usually the cab, from an on board source of pressurized fluid, usually the vehicle air system and or stored compressed air.

The term "inboard" is used to mean the direction axially toward the center of an axle assembly while the term "outboard" is used to mean the direction axially away from the center of an axle assembly.

Figure 1:
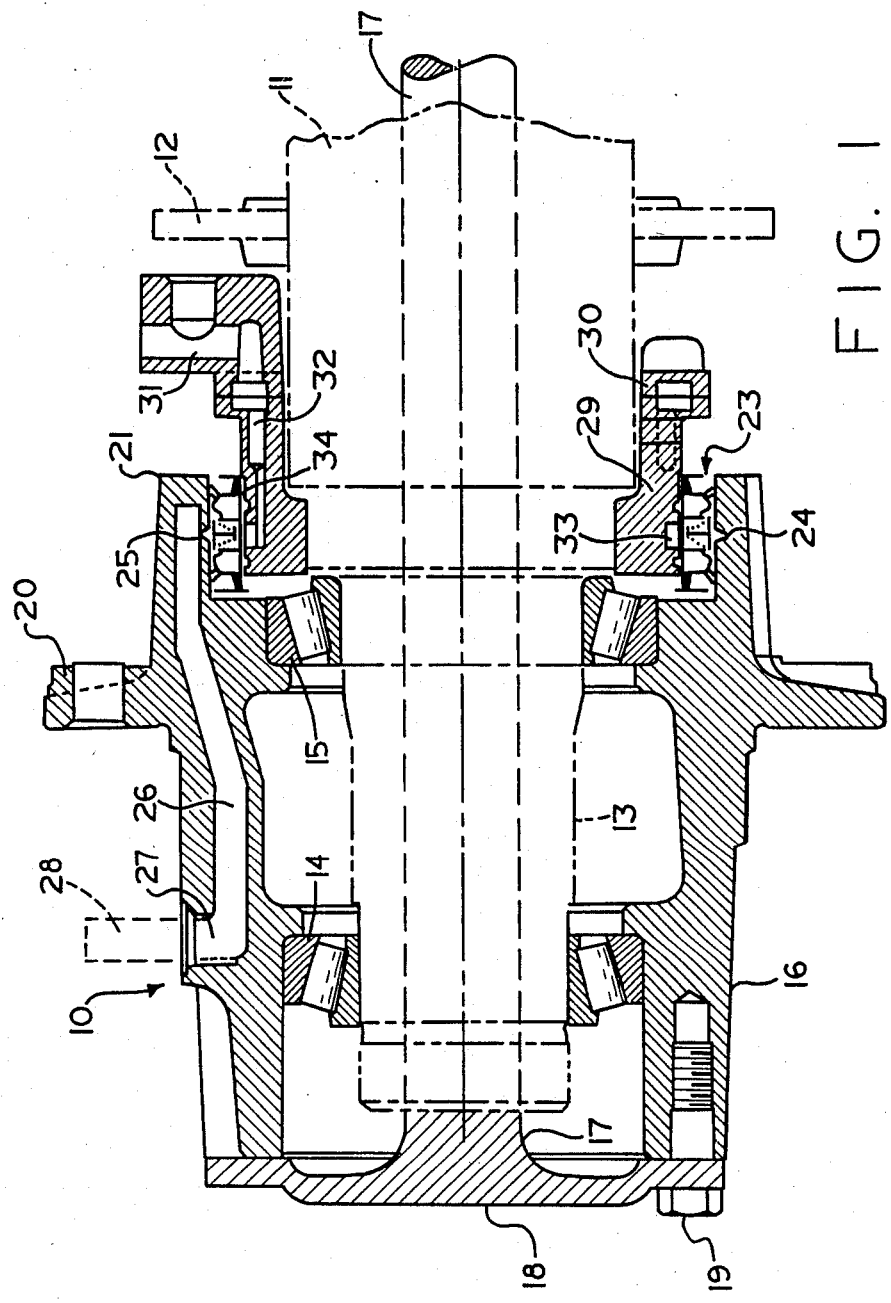
FIG. 1 is a partial sectional view of the axle and wheel assembly of this invention.

FIG. 1 of the drawing illustrates the invention in connection with a vehicle having a rear drive axle generally referred to by the numeral 10. The tubular axle housing 11 is suitably supported on the chassis of the vehicle and has an outboard spindle end 13 upon which tapered roller bearings 14 and 15 are received. A wheel hub 16 surrounds the spindle 13 and is rotatably supported on the bearings 14 and 15. An axle shaft 17 is rotatably received within the axle housing 11 and includes an outboard flange portion 18 which is fixed to the wheel hub 16 by means of bolts 19 for establishing a driving relationship between the axle shaft 17 and the hub 16. A tire and wheel assembly (not shown) is attached to a radially extending flange portion 20 of hub 16.

The wheel hub 16 includes an annular axially extending portion 21 which extends inwardly from the inboard bearing 15. The portion 21 has an annular inner sealing surface 22 which is generally concentric with and of greater diameter than the seal assembly 23. An annular groove 24 is formed in the inner sealing surface 22 and includes a second outlet 25 to the passageway 26 extending axially through the hub 16 and terminates in an outlet 27 suitably connected by a conduit 28 which is in turn connected to the rim of the tire mounted on the wheel (not shown).

A non-rotatable air inlet member 29 is mounted on the axle housing 11 adjacent the inboard bearing 15. The inboard end 30 of the member 29 is provided with an air inlet 31 communicating with a passageway 32 which terminates in a first air outlet 33 in the form of an annular groove. The outlet 33 is formed in the radially outer inboard surface 34 of the member 29 and is located generally in radial alignment with the groove 24.

Figure 2:
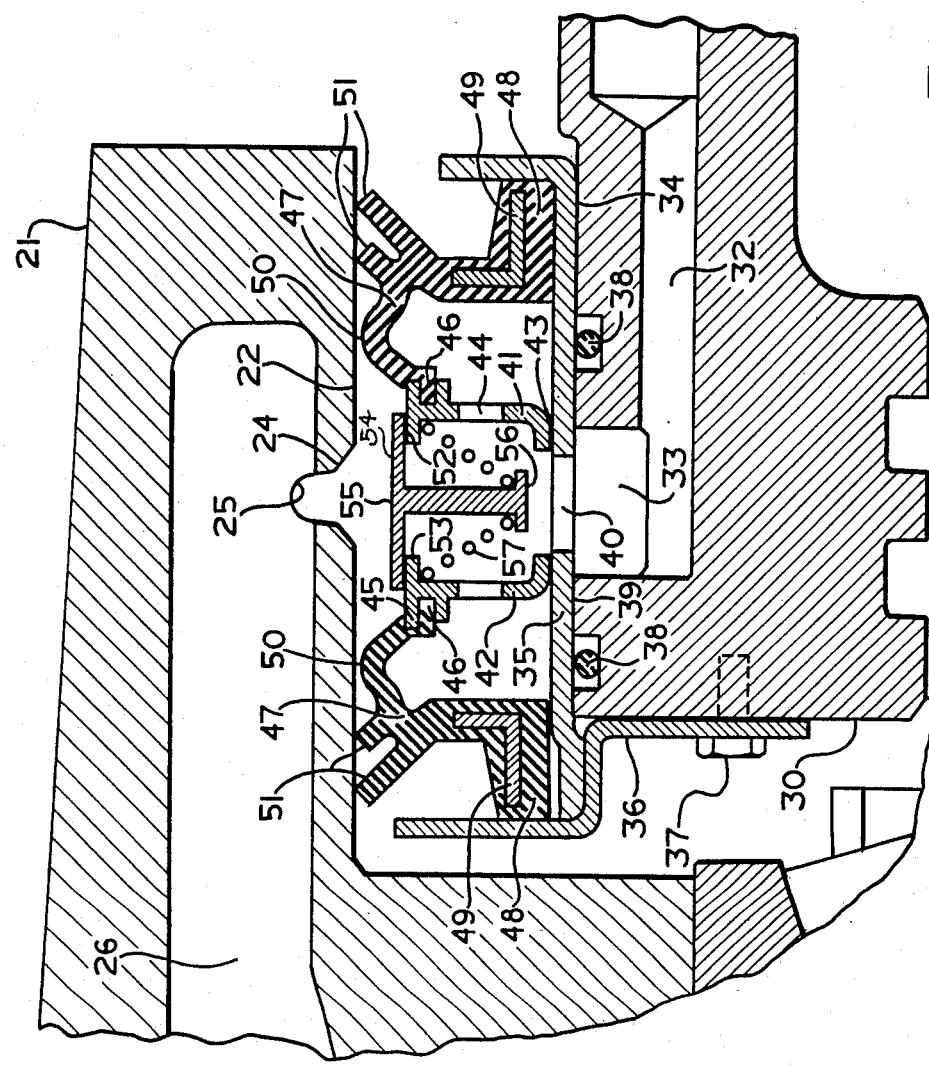
FIG. 2 is an enlarged partial view of the annular seal assembly shown in FIG. 1.

The seal assembly 23 seals the inboard surface 34 of the member 29 and the inner surface 22 of the wheel hub 16 so that pressurized air may pass from the outlet 33 through the seal assembly to the outlet 25 through the passageway 26 and hence to the tire without loss of air. The seal assembly 23, as shown in FIG. 2, includes a rigid annular rim member 35 having a flange 36 connected by suitable fasteners 37 to the outboard end 30 of the member 29. A pair of 0 rings 38 are provided, one on each side of the outlet 33 to seal the radially inner surface 39 of the rim member 35. A plurality of outlet holes 40 are formed in the member 35 in radial alignment with the outlet 33.

A pair of annular rigid uprights 41 and 42 are welded or otherwise secured at 43 to the member 35, each of which has an axially extending hole 44 circumferentially aligned with the outlet holes 40. Each of the uprights 41 and 42 have a pair of annular flanges 45 which are pressed or clamped to the annular ends 46 of the inflatable sealing bladders 47 made of rubber-like or elastomeric material. The opposite ends 48 of the bladders 47 each have an L shaped annular rigid member 49 embedded therein to provide rigidity to the ends 48 and thus seal the ends 48 to the rim member 35.

Each of the bladders 47 is provided with a bulbous shaped lobe 50 at the radially outer circumference which, upon pressurization of the bladders, expand radially and form an air tight seal against the surfaces 22 of the hub adjacent both sides of the groove 24 and outlet 25. When the bladders are depressurized, as shown in FIG. 2, the lobes ride very lightly, if at all, against the surfaces 22 and do not form a seal. Additionally each of the bladders is provided with one or more dust tabs 51 which bear against the surfaces 22 adjacent the groove 24 to prevent dust and other debris from entering the space between the lobes 50 and from reaching the sealing surfaces 22.

The radially outer surface 52 of the uprights 41 and 42 extends continuously and circumferentially. One or more holes 53 are formed in the radially outward surface 52. Check valves 54 are provided with a large head 55 which seals against the periphery of the holes 53 and a smaller head 56 is provided at the opposite end of the valve. A spring 57 is interposed between the head 56 and the undersurface of the valve seat so that the valve is normally in closed position and seals the holes 53.

Figure 3:
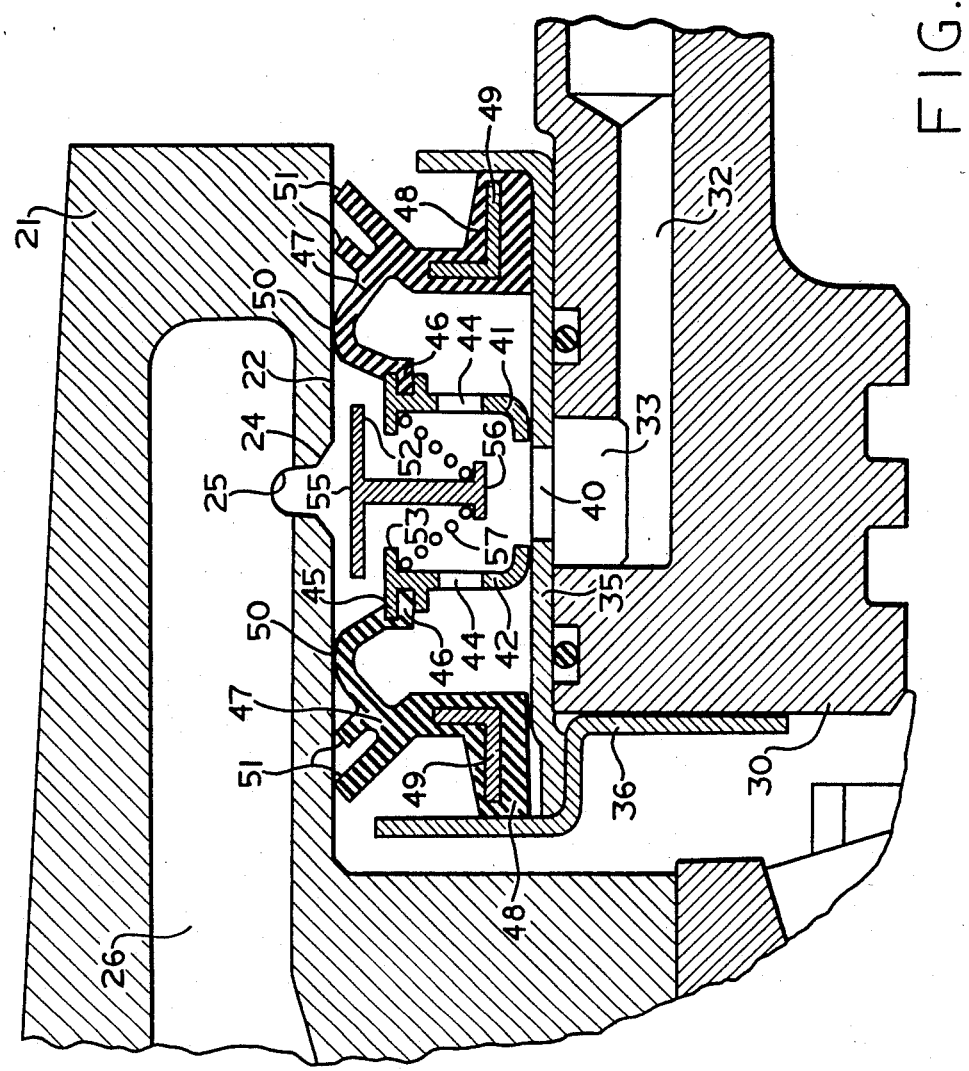
FIG. 3 is a view similar to FIG. 2 with the lobes of the seal assembly inflated.

In operation, the seal assembly 23 is depressurized initially, as shown in FIG. 2, and the valves 54 are in their normally closed position. The lobes 50 bear against the surfaces 22 with very light if any pressure and not in sealing relationship with the surfaces 22. When it is desired to inflate the tire, pressurized air is admitted through the air inlet 31 from a compressed air source on the vehicle and passes through the outlet 40 and the holes 44 in the uprights to pressurize the bladders and particularly the lobes 50. Pressurization of the lobes continues until the pressure therein exceeds the force required to compress the spring 57, at which time the check valves 54 open and permits air to flow into the tire, as shown in FIG. 3. When the valves 54 open the pressure in each of the lobes 50 is sufficient to effect an air tight seal against the surfaces 22. The air tight seal against the surfaces 22 is effective whether the wheel and the hub 16 is stationery or rotating relative to the non-rotatable member 29.

A suitable check valve (not shown) is provided in an air circuit to the tire upstream from the passageway 26 to keep the tire pressurized at the increased pressure. When the tire has been inflated to the desired pressure, the air inlet 31 is connected to exhaust or atmospheric pressure thereby depressurizing the seal assembly 23 and causing the valves 54 to close, at which time the lobes 50 return to the position shown in FIG. 2. It is thus seen that the seal assembly 23 effects a seal against the surfaces 22 only "on demand" or when air pressure is being injected into the tire.

Figure 4:
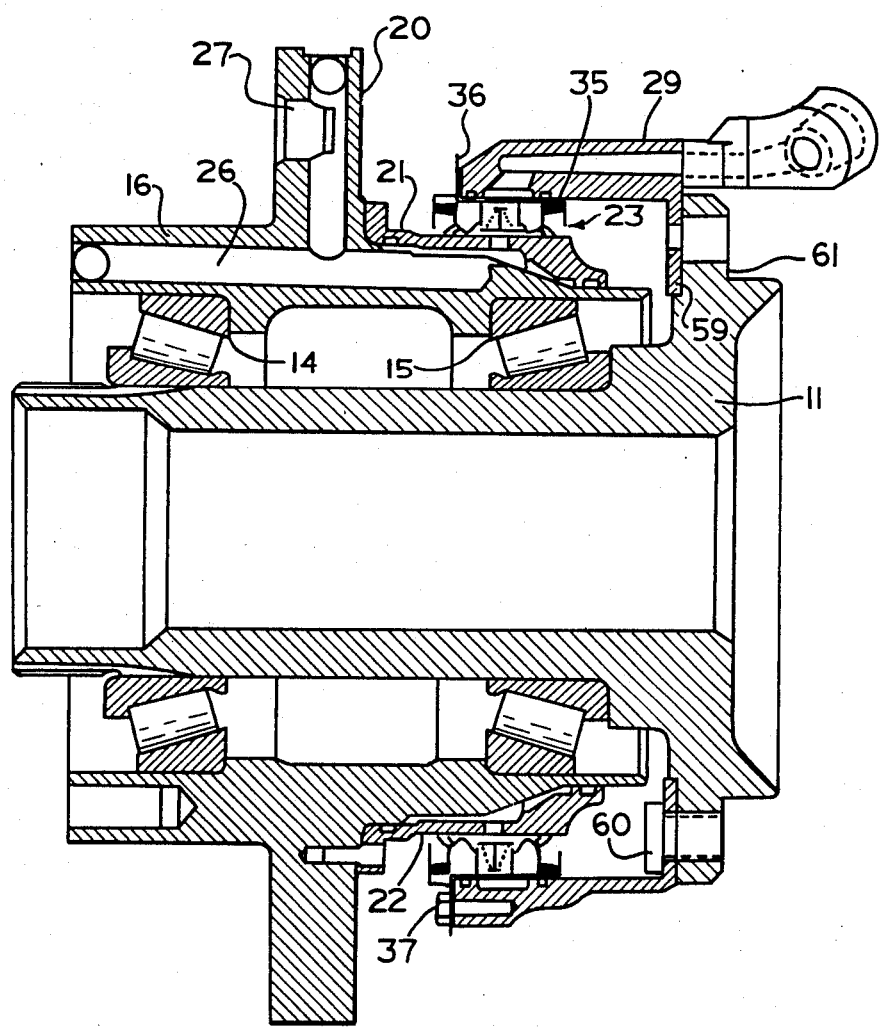
FIG. 4 is a view similar to FIG. 1 of another embodiment of this invention.

In FIG. 4, another modification of the invention is shown in which the seal assembly 23 is positioned radially outwardly of the wheel hub 16 which may be desireable in the front wheel steering axle of a vehicle having a central tire inflation system. The flange 36 of the rim member 35 is attached by bolts 37 to the outboard end of the non-rotatable air inlet member 29 which is provided with a radial flange 59 attached by bolts 60 to the flange 61 of the non-rotatable axle spindle or housing 11. Accordingly, the lobes 50 expand radially inwardly when pressurized, and seal against the sealing surfaces 22 formed on the radially outer surface of the wheel hub portion 21. The construction and operation of the embodiment of the invention shown in FIG. 4 is otherwise similar to that shown in FIG. 1, except that the lobes 50 are supported by non-rotatable member 29 and expand radially inwardly against the rotating sealing surfaces 22 of the wheel hub 16.

It can be appreciated that the sealing lobes 50 are expandable radially in either an outward direction as shown in FIGS. 1, 2 and 3, or in a radially inward direction as shown in FIG. 4.

In all the embodiments, the lobes 50 expand radially and seal against cylindrical sealing surfaces. The seal is formed only "on demand" or when it is necessary that a seal be made, namely, when air is to be injected into the tire.

It can also be appreciated that, since the seal assembly is fixed or secured to a non-rotating part of an axle and wheel assembly, a reliable seal is formed with that part and the lobes are accurately and reliably expanded to seal against a rotating cylindrical sealing surface.

I claim:

1. A vehicle axle and wheel assembly including a wheel and tire rotatably mounted on axially spaced bearings, a pressurized air source on said vehicle, and an air circuit for conducting pressurized air from said source to said tire, the improvement comprising;

a non-rotatable annular member supported inboard of said bearings and adjacent an axial end of said wheel, said non-rotatable annular member having first passage means connected to said source of pressurized air, said first passage means terminating in a first outlet having a radially outward sealing surface;

said wheel having a rotatable hub member having portion spaced radially from said non-rotatable member and having second passage means therein terminating in a second outlet, conduit means for communicating air from the second passage means in said rotatable hub member to said tire, said first and second outlets being axially aligned;

said rotatable hub member having a radially facing annular sealing surface on each axial side of said first and second outlets;

an annular sealing assembly secured to said non-rotatable member in sealing relationship with the sealing surface of said non-rotatable member;

said annular sealing assembly having a pair of annular radially expandable lobes axially aligned with the radially facing annular sealing surface on each axial side of said first and second outlets which upon pressurization expand radially into sealing engagement with the sealing surfaces of said hub member, and;

a normally closed check valve means operably connected to said sealing assembly for permitting the flow of pressurized air to said lobes to expand said lobes radially into sealing relationship with the sealing surfaces of said hub member to seal the same and prevent leakage between the non-rotatable member and hub, said check valve having means to prevent it from opening until said lobes are pressurized, said check valve when opened permitting the flow of pressurized air into said tire.

2. A vehicle axle and wheel assembly as claimed in claim 1 in which said seal assembly includes an annular rigid mounting means for securing said sealing assembly to said non-rotatable member and means for sealing mounting means to said non-rotatable member.

3. A vehicle axle and wheel assembly as claimed in claim 2 in which said rigid mounting means includes a pair of sealing surfaces coextensive with and radially facing the sealing surfaces of said non-rotatable member.

4. A vehicle axle and wheel assembly as claimed in claim 1 in which said expandable lobes expand radially inwardly into sealing engagement with the sealing surfaces of said rotatable hub member.

5. A vehicle axle and wheel assembly as claimed in claim 1 in which said lobes expand radially outwardly into sealing engagement with the sealing surfaces of said rotatable hub member.

6. A vehicle axle and wheel assembly as claimed in claim 2 in which said mounted means are secured to the non-rotatable member and said lobes expand radially into sealing engagement with the rotatable hub member.

7. A vehicle axle and wheel assembly as claimed in claim 1 in which said check valve is mounted between said lobes, said check valve having passage means for conducting air from said inlet to said lobes when said valve is closed.

8. A vehicle axle and wheel assembly as claimed in claim 1 in which said check valve includes spring means for maintaining said valve in closed position until said lobes are pressurized to a predetermined pressure.

* * * * *